US011509510B1

(12) United States Patent
Winterberg et al.

(10) Patent No.: US 11,509,510 B1
(45) Date of Patent: Nov. 22, 2022

(54) MANAGING DECISION FEEDBACK EQUALIZATION AT MEMORY MODULES OF AN INFORMATION HANDLING SYSTEM

(71) Applicant: Dell Products L.P., Round Rock, TX (US)

(72) Inventors: Douglas Stanley Winterberg, Austin, TX (US); Wan-Ju Kuo, New Taipei (TW); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/448,745

(22) Filed: Sep. 24, 2021

(51) Int. Cl.
*H04L 25/03* (2006.01)
(52) U.S. Cl.
CPC .............................. *H04L 25/03949* (2013.01)
(58) Field of Classification Search
CPC ................................................ H04L 25/03949
See application file for complete search history.

(56) References Cited

PUBLICATIONS

Horowitz, Mark; "FIR Design and Decision Feedback Equalization," Computer Systems Laboratory Stanford University, Stanford, CA; 2007,18 pages (Year: 2007).*

* cited by examiner

*Primary Examiner* — Nader Bolourchi
(74) *Attorney, Agent, or Firm* — McDermott Will & Emery LLP (57) ABSTRACT

Managing performance at a memory subsystem, including: performing DFE at a memory subsystem based on an initial number of taps and an initial tap value range, the memory subsystem including memory modules and memory channels connecting respective memory modules; determining, based on the initial number of taps and the initial tap value range, a channel margin of a particular channel of the memory subsystem; disabling, at the particular channel, a tap; calculating, based on the disabled tap at the particular channel, a reduction in the channel margin of the particular channel; comparing the reduced channel margin of the particular channel to a margin threshold; determining, based on the comparing, that the reduced channel margin of the particular channel is greater than the margin threshold; in response to determining that the reduced channel margin of the channel is greater than the threshold, retaining the tap at the particular channel.

20 Claims, 3 Drawing Sheets

MANAGING DECISION FEEDBACK EQUALIZATION AT MEMORY MODULES OF AN INFORMATION HANDLING SYSTEM

BACKGROUND

Field of the Disclosure

The disclosure relates generally to an information handling system, and in particular, managing decision feedback equalization at memory modules of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With DDR speeds touching PCIe speeds (6.4 to 8 Gbps), signal degradation due to inter-symbol interference (ISI) and reflections is expected to increase. DDR channels are plagued with reflections compared to serial links due to the multi-drop nature of the topology and due to the single-ended nature of the signaling.

SUMMARY

Innovative aspects of the subject matter described in this specification may be embodied in a method of managing performance at a memory subsystem, the method including performing an initial decision feedback equalization (DFE) at a memory subsystem based on an initial number of taps and an initial tap value range, the memory subsystem including a plurality of memory modules and memory channels connecting respective memory modules; determining, based on the initial number of taps and the initial tap value range, a channel margin of a particular channel of the memory subsystem; disabling, at the particular channel, a tap; calculating, based on the disabled tap at the particular channel, a reduction in the channel margin of the particular channel; comparing the reduced channel margin of the particular channel to a margin threshold; determining, based on comparing the reduced channel margin of the particular channel to the margin threshold, that the reduced channel margin of the particular channel is greater than the margin threshold; and in response to determining that the reduced channel margin of the channel is greater than the threshold, retaining the tap at the particular channel.

Other embodiments of these aspects include corresponding systems, apparatus, and computer programs, configured to perform the actions of the methods, encoded on computer storage devices.

These and other embodiments may each optionally include one or more of the following features. For instance, determining, based on comparing the reduced channel margin of the particular channel to the margin threshold, that the reduced channel margin of the particular channel is less than the margin threshold; and in response to determining that the reduced channel margin of the channel is less than the margin threshold, disabling, at the particular channel, an additional tap. Calculating, based on the tap and the additional tap at the particular channel, an additional reduction in the channel margin of the particular channel; comparing the additional reduced channel margin of the particular channel to the margin threshold; determining, based on comparing the additional reduced channel margin of the particular channel to the margin threshold, that the additional reduced channel margin of the particular channel is greater than the margin threshold; and in response to determining that the additional reduced channel margin of the channel is greater than the margin threshold, retaining the tap and the additional tap at the particular channel. After retaining the tap at the particular channel, further comprising: calculating, a plurality of times and based on the disabled tap at the particular channel, the reduction in the channel margin of the particular channel; determining a variation of the reduced channel margin between each of the calculations of the reduction in the channel margin of the particular channel; comparing the variation to a variation threshold; determining, based on comparing the variation to the variation threshold, that the variation is greater than the variation threshold; and in response to determining that the variation is greater than the variation threshold, limiting the tap value range. After retaining the tap at the particular channel, further comprising: calculating, a plurality of times and based on the disabled tap at the particular channel, the reduction in the channel margin of the particular channel; determining a variation of the reduced channel margin between each of the calculations of the reduction in the channel margin of the particular channel; comparing the variation to a variation threshold; determining, based on comparing the variation to the variation threshold, that the variation is less than the variation threshold; in response to determining that the variation is less than the variation threshold, retaining the tap value range. Initializing the memory subsystem, including setting default values for mode register settings of the memory subsystem. Calibrating the memory subsystem, including on-die termination (ODT) calibration and ZQ calibration at the memory subsystem.

Particular implementations of the subject matter described in this specification can be implemented so as to realize one or more of the following advantages. For example, DFE convergence is optimized and run-to-run variation is minimized.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing decision feedback equalization at memory modules of an information handling system. In short, decision feedback equalization (DFE) can be utilized to minimize/reduce inter-symbol interference (ISI) and reflections at a memory subsystem. Application of a number of taps and the range of each of the taps can be based on a positioning of the memory element/module (e.g., DIMM) of the memory subsystem to ensure optimal performance of the DFE. That is, each memory channel can be associated with its own number of taps and tap ranges for optimal performance.

Specifically, this disclosure discusses a system and a method for managing performance at a memory subsystem, including performing an initial decision feedback equalization (DFE) at the memory subsystem based on an initial number of taps and an initial tap value range, the memory subsystem including a plurality of memory modules and memory channels connecting respective memory modules; determining, based on the initial number of taps and the initial tap value range, a channel margin of a particular channel of the memory subsystem; disabling, at the particular channel, a tap; calculating, based on the disabled tap at the particular channel, a reduction in the channel margin of the particular channel; comparing the reduced channel margin of the particular channel to a margin threshold; determining, based on comparing the reduced channel margin of the particular channel to the margin threshold, that the reduced channel margin of the particular channel is greater than the margin threshold; and in response to determining that the reduced channel margin of the channel is greater than the threshold, retaining the tap at the particular channel.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
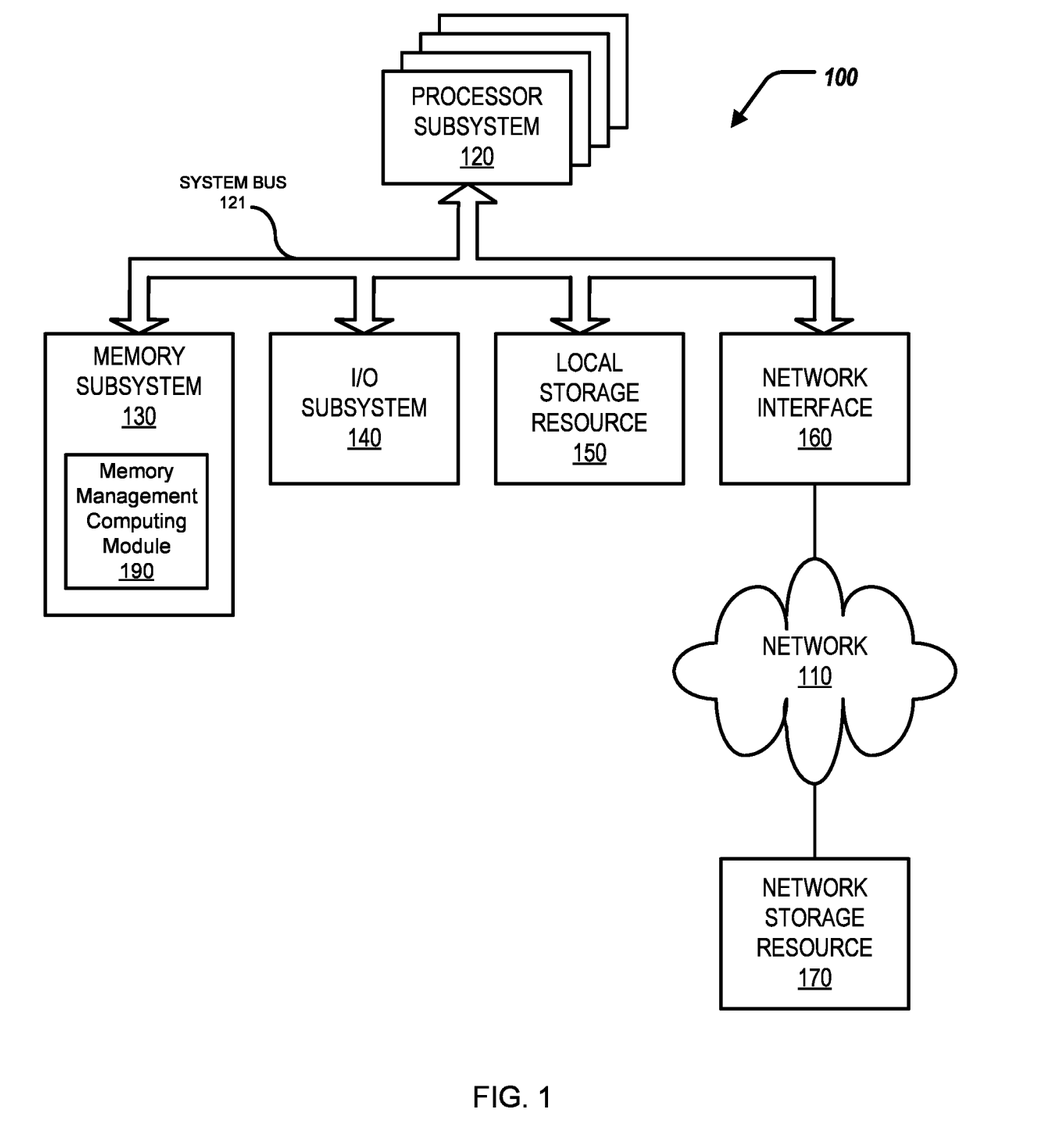
FIG. 1 is a block diagram of selected elements of an embodiment of an information handling system.
Figure 2:
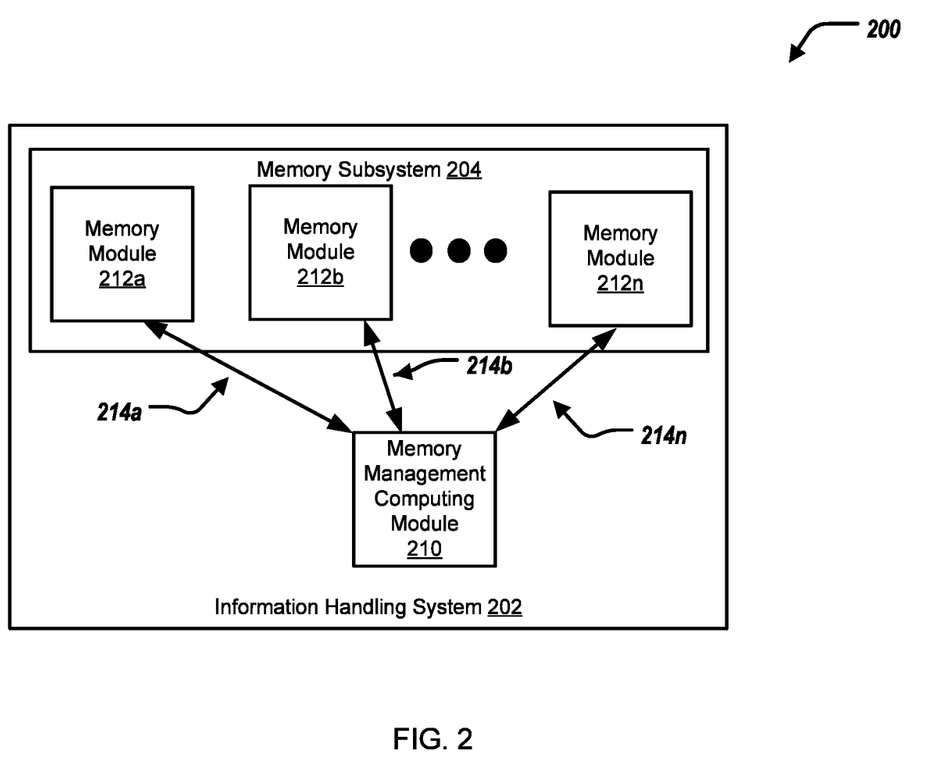
FIG. 2 illustrates a block diagram of an information handling system for managing decision feedback equalization at memory modules of the information handling system.
Figure 3:
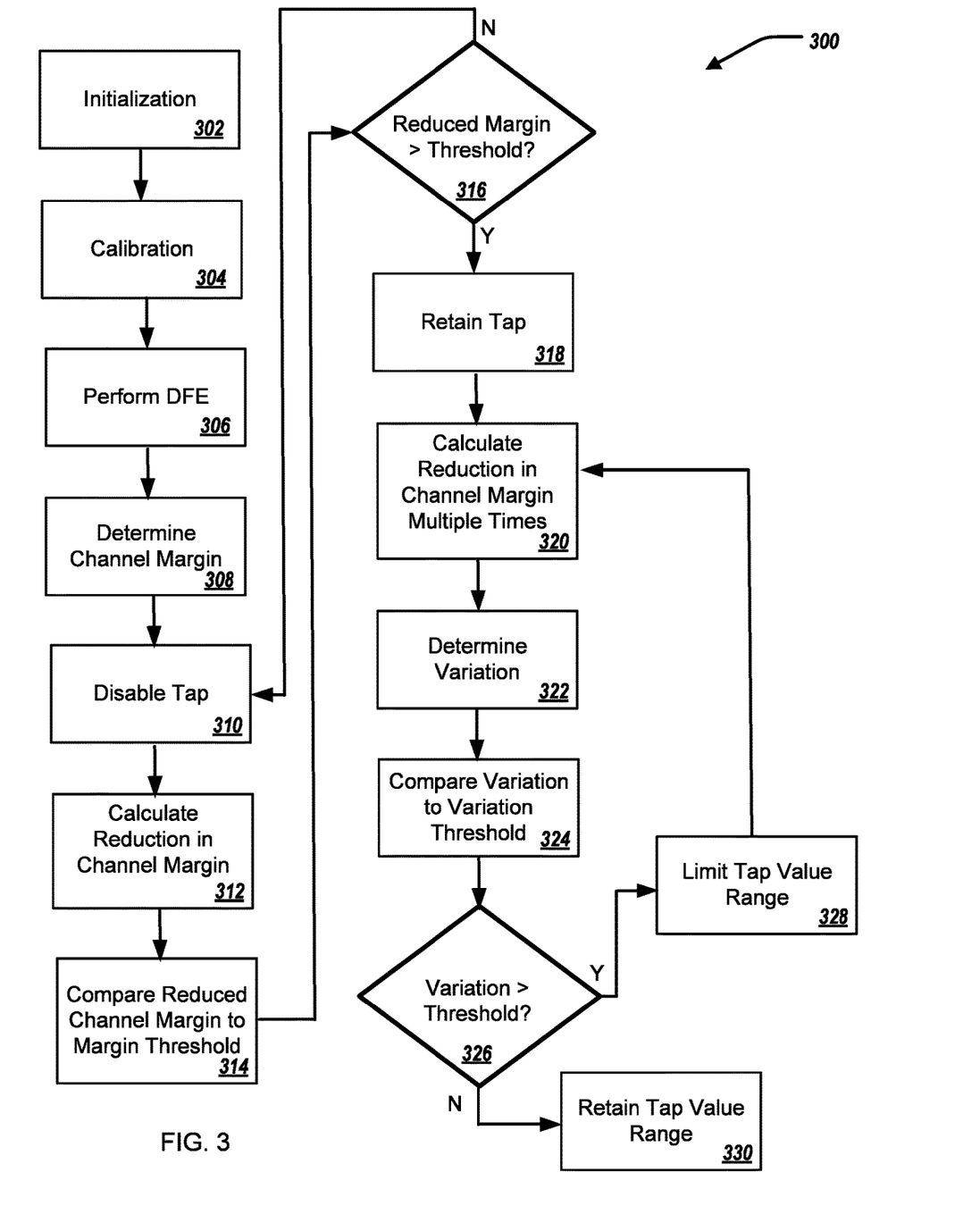
FIG. 3 illustrates a method for managing decision feedback equalization at memory modules of an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a memory management computing module 190. The memory management computing module 190 can be included by the memory subsystem 130. The memory management computing module 190 can include a computer-executable program (software). The memory management computing module 190 can be executed by the processor subsystem 120.

In short, decision feedback equalization (DFE) can be utilized to minimize/reduce inter-symbol interference (ISI) and reflections at a memory subsystem (e.g., the memory subsystem 130). The memory management computing module 190 can apply (or limit) a number of taps and the range of each of the taps based on a positioning of the memory element/module (e.g., DIMM) of the memory subsystem to ensure optimal performance of the DFE. That is, each memory channel can be associated with its own number of taps and tap ranges for optimal performance.

Turning to FIG. 2, FIG. 2 illustrates an environment 200 including an information handling system 202. The information handling system 202 can include a memory management computing module 190 and a memory subsystem 204. The memory subsystem 204 can include memory modules 212a, 212b, . . . , 212n (collectively referred to as memory modules 212). In some examples, the information handling system 202 is similar to, or includes, the information handling system 100 of FIG. 1. In some examples, the memory management computing module 210 is the same, or substantially the same, as the memory management computing module 190 of FIG. 1.

The memory management computing module 210 can be in communication with the memory modules 212, 212b, . . . , 212n over respective memory channels 214a, 214b, . . . , 214n (collectively referred to as memory channels 214).

In some examples, the memory modules 212 can include dynamic random-access memory (DRAM).

In short, the memory management computing module 210 determines, based on each individual memory channel 214, a number of tap and a range of the taps for the memory channel 314 and/or the memory module 212 such that the memory channel 214 and/or the memory module 214 operates at an optimal performance level while reducing power consumption of the same.

FIG. 3 illustrates a flowchart depicting selected elements of an embodiment of a method 300 for decision feedback equalization at memory modules. The method 300 may be performed by the information handling system 100, the information handling system 202 and/or the memory management computing module 210, and with reference to FIGS. 1-2. It is noted that certain operations described in method 300 may be optional or may be rearranged in different embodiments.

The memory management computing module 210 can initialize the memory subsystem 204, at 302. Specifically, the memory management computing module 210 can load/set default/initial values for mode register settings of the memory subsystem 204. This can minimize, if not prevent, the memory modules 212 from functioning improperly. The memory management computing module 210 can calibrate the memory subsystem 204, at 304. Specifically, the memory management computing module 210 can perform on-die termination (ODT) calibration and ZQ calibration at the memory subsystem 204. The ZQ calibration can calibrate an output driver impedance across process, temperature, and voltage of the memory subsystem 204. The ODT calibration can improve signal integrity of the memory channel 214 by allowing independent change of termination resistance for the memory modules 212.

The memory management computing module 210 performs an initial decision feedback equalization (DFE) at the memory subsystem 204, at 306. Specifically, the memory management computing module 210 performs an initial DFE at the memory subsystem 204 based on an initial number of taps and an initial tap value range. In short, performing DFE at the memory subsystem 204 can reduce an impact of inter-symbol interference (ISI) and reflections at the memory subsystem 204.

The memory management computing module 210 can determine, based on the initial number of taps and the initial tap value range, a channel margin of a memory channel 214 of the memory subsystem 204, at 308. For example, the memory management computing module 210 can determine, based on the initial number of taps and the initial tap value range, a channel margin of the memory channel 214a for the memory module 212a.

The memory management computing module 210 can disable, at the memory channel 214, a tap, at 310. For example, the memory management computing module 210 can disable, at the memory channel 214a, a tap. The memory management computing module 210 can calculate, based on the disabled tap at the memory channel 214, a reduction in the channel margin of the memory channel 214, at 312. For example, the memory management computing module 210 can calculate, based on the disabled tap at the memory channel 214a, a reduction in the channel margin of the memory channel 214a.

The memory management computing module 210 can compare the reduced channel margin of the memory channel 214 to a margin threshold, at 314. For example, the memory management computing module 210 can compare the reduced channel margin of the memory channel 214a to the margin threshold. The memory management computing module 210 can determine whether, based on comparing the reduced channel margin of the memory channel 214 to the margin threshold, the reduced channel margin of the memory channel 214 is greater than the margin threshold, at 316. For example, the memory management computing module 210 can determine whether, based on comparing the reduced channel margin of the memory channel 214a to the margin threshold, the reduced channel margin of the memory channel 214a is greater than the margin threshold.

In some examples, the memory management computing module 210 can determine that, based on comparing the reduced channel margin of the memory channel 214 to the margin threshold, that the reduced channel margin of the memory channel 214 is greater than the margin threshold (at 316), and in response, retain the tap at the memory channel 214, at 318. For example, the memory management computing module 210 can determine that, based on comparing the reduced channel margin of the memory channel 214a to the margin threshold, that the reduced channel margin of the memory channel 214a is greater than the margin threshold, and in response, retain the tap at the memory channel 214a.

In some examples, the memory management computing module 210 can determine that, based on comparing the reduced channel margin of the memory channel 214 to the margin threshold, that the reduced channel margin of the memory channel 214 is less than the margin threshold (at 316), and in response, disable, at the memory channel 214, an additional tap, at 310. For example, the memory management computing module 210 can determine that, based on comparing the reduced channel margin of the memory channel 214a to the margin threshold, that the reduced channel margin of the memory channel 214a is less than the margin threshold, and in response, disable, at the memory channel 214a, an additional tap. The memory management computing module 210 can calculate, based on the tap and the additional tap at the memory channel 214, an additional reduction in the channel margin of the memory channel (at 312); compare the additional reduced channel margin of the memory channel 214 to a margin threshold, at 314; determine whether, based on comparing the additional reduced channel margin of the memory channel 214 to the margin threshold, the additional reduced channel margin of the memory channel 214 is greater than the margin threshold, at 316. The process can continue to 318 when the additional reduced channel margin of the memory channel 214 is greater than the margin threshold; or can continue back to 310 when the additional reduced channel margin of the memory channel 214 is less than the margin threshold.

The memory management computing module 210, after retaining the tap at 318, can calculate, based on the disabled tap at the memory channel 214, the reduction in the channel margin of the memory channel 214 over a plurality of times, at 320. For example, the memory management module 210, can calculate, based on the disabled tap at the memory channel 214a, the reduction in the channel margin of the memory channel 214a over a plurality of times. The memory management computing module 210 can determine a variation of the reduced channel margin between each of the calculations of the reduction in the channel margin of the memory channel 214, at 322. For example, the memory management module 210 can determine a variation of the reduced channel margin between each of the calculations of the reduction in the channel margin of the memory channel 214a.

The memory management computing module 210 can compare the variation to a variation threshold, at 324. The memory management computing module 210 can determine, based on comparing the variation to the variation threshold, whether the variation is greater than the variation threshold, at 326. In some examples, the memory management computing module 210 can determine that, based on comparing the variation to the variation threshold, that the variation is greater than the variation threshold (at 326), and in response, limit the tap value range, at 328. Furthermore, the memory management computing module 210 can also determine at 326 whether the memory channel 214 fails margin limits (e.g., due to sub-optimal convergence), and if it is determined that the memory channel 214 fails the margin limits, the memory management computing module 210 can limit the tap value range at 328. Limiting the tap value range can additionally result in power savings at the memory subsystem 204.

After limiting the tap value range (at 328), the process 300 returns to step 320.

In some examples, memory management computing module 210 can determine that, based on comparing the variation to the variation threshold, that the variation is less than the variation threshold (at 326), and in response, retain the tap value ranges, at 330.

The process 300 can be repeated for any of the memory modules 212 and any of the memory channels 214.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing performance at a memory subsystem, the method comprising:

performing an initial decision feedback equalization (DFE) at a memory subsystem based on an initial number of taps and an initial tap value range, the memory subsystem including a plurality of memory modules and memory channels connecting respective memory modules;

determining, based on the initial number of taps and the initial tap value range, a channel margin of a particular channel of the memory subsystem;

disabling, at the particular channel, a tap;

calculating, based on the disabled tap at the particular channel, a reduction in the channel margin of the particular channel;

comparing the reduced channel margin of the particular channel to a margin threshold;

determining, based on comparing the reduced channel margin of the particular channel to the margin threshold, that the reduced channel margin of the particular channel is greater than the margin threshold; and in response to determining that the reduced channel margin of the channel is greater than the threshold, retaining the tap at the particular channel.

2. The computer-implemented method of claim 1, further comprising:

determining, based on comparing the reduced channel margin of the particular channel to the margin threshold, that the reduced channel margin of the particular channel is less than the margin threshold; and in response to determining that the reduced channel margin of the channel is less than the margin threshold, disabling, at the particular channel, an additional tap.

3. The computer-implemented method of claim 2, further comprising:

calculating, based on the tap and the additional tap at the particular channel, an additional reduction in the channel margin of the particular channel;

comparing the additional reduced channel margin of the particular channel to the margin threshold;

determining, based on comparing the additional reduced channel margin of the particular channel to the margin threshold, that the additional reduced channel margin of the particular channel is greater than the margin threshold; and in response to determining that the additional reduced channel margin of the channel is greater than the margin threshold, retaining the tap and the additional tap at the particular channel.

4. The computer-implemented method of claim 1, after retaining the tap at the particular channel, further comprising:

calculating, a plurality of times and based on the disabled tap at the particular channel, the reduction in the channel margin of the particular channel;

determining a variation of the reduced channel margin between each of the calculations of the reduction in the channel margin of the particular channel;

comparing the variation to a variation threshold;

determining, based on comparing the variation to the variation threshold, that the variation is greater than the variation threshold; and in response to determining that the variation is greater than the variation threshold, limiting the tap value range.

5. The computer-implemented method of claim 1, after retaining the tap at the particular channel, further comprising:

calculating, a plurality of times and based on the disabled tap at the particular channel, the reduction in the channel margin of the particular channel;

determining a variation of the reduced channel margin between each of the calculations of the reduction in the channel margin of the particular channel;

comparing the variation to a variation threshold;

determining, based on comparing the variation to the variation threshold, that the variation is less than the variation threshold;

in response to determining that the variation is less than the variation threshold, retaining the tap value range.

6. The computer-implemented method of claim 1, further comprising:

initializing the memory subsystem, including setting default values for mode register settings of the memory subsystem.

7. The computer-implemented method of claim 1, further comprising:

calibrating the memory subsystem, including on-die termination (ODT) calibration and ZQ calibration at the memory subsystem.

8. A non-transitory computer-readable medium storing software comprising instructions executable by one or more computers which, upon such execution, cause the one or more computers to perform operations comprising:

performing an initial decision feedback equalization (DFE) at a memory subsystem based on an initial number of taps and an initial tap value range, the memory subsystem including a plurality of memory modules and memory channels connecting respective memory modules;

determining, based on the initial number of taps and the initial tap value range, a channel margin of a particular channel of the memory subsystem;

disabling, at the particular channel, a tap;

calculating, based on the disabled tap at the particular channel, a reduction in the channel margin of the particular channel;

comparing the reduced channel margin of the particular channel to a margin threshold;

determining, based on comparing the reduced channel margin of the particular channel to the margin threshold, that the reduced channel margin of the particular channel is greater than the margin threshold; and in response to determining that the reduced channel margin of the channel is greater than the threshold, retaining the tap at the particular channel.

9. The computer-readable medium of claim 8, the operations further comprising:

determining, based on comparing the reduced channel margin of the particular channel to the margin threshold, that the reduced channel margin of the particular channel is less than the margin threshold; and in response to determining that the reduced channel margin of the channel is less than the margin threshold, disabling, at the particular channel, an additional tap.

10. The computer-readable medium of claim 9, the operations further comprising:

calculating, based on the tap and the additional tap at the particular channel, an additional reduction in the channel margin of the particular channel;

comparing the additional reduced channel margin of the particular channel to the margin threshold;

determining, based on comparing the additional reduced channel margin of the particular channel to the margin threshold, that the additional reduced channel margin of the particular channel is greater than the margin threshold; and in response to determining that the additional reduced channel margin of the channel is greater than the margin threshold, retaining the tap and the additional tap at the particular channel.

11. The computer-readable medium of claim 8, after retaining the tap at the particular channel, the operations further comprising:

calculating, a plurality of times and based on the disabled tap at the particular channel, the reduction in the channel margin of the particular channel;

determining a variation of the reduced channel margin between each of the calculations of the reduction in the channel margin of the particular channel;

comparing the variation to a variation threshold;

determining, based on comparing the variation to the variation threshold, that the variation is greater than the variation threshold; and in response to determining that the variation is greater than the variation threshold, limiting the tap value range.

12. The computer-readable medium of claim 8, after retaining the tap at the particular channel, the operations further comprising:

calculating, a plurality of times and based on the disabled tap at the particular channel, the reduction in the channel margin of the particular channel;

determining a variation of the reduced channel margin between each of the calculations of the reduction in the channel margin of the particular channel;

comparing the variation to a variation threshold;

determining, based on comparing the variation to the variation threshold, that the variation is less than the variation threshold;

in response to determining that the variation is less than the variation threshold, retaining the tap value range.

13. The computer-readable medium of claim 8, the operations further comprising:

initializing the memory subsystem, including setting default values for mode register settings of the memory subsystem.

14. The computer-readable medium of claim 8, the operations further comprising:

calibrating the memory subsystem, including on-die termination (ODT) calibration and ZQ calibration at the memory subsystem.

15. An information handling system, comprising:

a processor;

a memory subsystem; and memory media storing instructions executable by the processor to perform operations, comprising:

performing an initial decision feedback equalization (DFE) at the memory subsystem based on an initial number of taps and an initial tap value range, the memory subsystem including a plurality of memory modules and memory channels connecting respective memory modules;

determining, based on the initial number of taps and the initial tap value range, a channel margin of a particular channel of the memory subsystem;

disabling, at the particular channel, a tap;

calculating, based on the disabled tap at the particular channel, a reduction in the channel margin of the particular channel;

comparing the reduced channel margin of the particular channel to a margin threshold;

determining, based on comparing the reduced channel margin of the particular channel to the margin threshold, that the reduced channel margin of the particular channel is greater than the margin threshold; and in response to determining that the reduced channel margin of the channel is greater than the threshold, retaining the tap at the particular channel.

16. The information handling system of claim 15, the operations further comprising:

determining, based on comparing the reduced channel margin of the particular channel to the margin threshold, that the reduced channel margin of the particular channel is less than the margin threshold; and in response to determining that the reduced channel margin of the channel is less than the margin threshold, disabling, at the particular channel, an additional tap.

17. The information handling system of claim 16, the operations further comprising:

calculating, based on the tap and the additional tap at the particular channel, an additional reduction in the channel margin of the particular channel;

comparing the additional reduced channel margin of the particular channel to the margin threshold;

determining, based on comparing the additional reduced channel margin of the particular channel to the margin threshold, that the additional reduced channel margin of the particular channel is greater than the margin threshold; and in response to determining that the additional reduced channel margin of the channel is greater than the margin threshold, retaining the tap and the additional tap at the particular channel.

18. The information handling system of claim 15, after retaining the tap at the particular channel, the operations further comprising:

calculating, a plurality of times and based on the disabled tap at the particular channel, the reduction in the channel margin of the particular channel;

determining a variation of the reduced channel margin between each of the calculations of the reduction in the channel margin of the particular channel;

comparing the variation to a variation threshold;

determining, based on comparing the variation to the variation threshold, that the variation is greater than the variation threshold; and in response to determining that the variation is greater than the variation threshold, limiting the tap value range.

19. The information handling system of claim 15, after retaining the tap at the particular channel, the operations further comprising:

calculating, a plurality of times and based on the disabled tap at the particular channel, the reduction in the channel margin of the particular channel;

determining a variation of the reduced channel margin between each of the calculations of the reduction in the channel margin of the particular channel;

comparing the variation to a variation threshold;

determining, based on comparing the variation to the variation threshold, that the variation is less than the variation threshold;

in response to determining that the variation is less than the variation threshold, retaining the tap value range.

20. The information handling system of claim 15, the operations further comprising:

initializing the memory subsystem, including setting default values for mode register settings of the memory subsystem.

* * * * *